United States Patent [19]
von Harpe et al.

[11] Patent Number: 5,240,688
[45] Date of Patent: Aug. 31, 1993

[54] PROCESS FOR THE IN-LINE HYDROLYSIS OF UREA

[75] Inventors: Thure von Harpe, Meerbusch; Reihard Pachaly, Kerpen, both of Fed. Rep. of Germany, and John E. Holfmann, Naperville, IL

[73] Assignee: Fuel Tech GmbH, Essen Kettwig, Fed. Rep. of Germany

[21] Appl. No.: 561,154

[22] Filed: Aug. 1, 1990

[51] Int. Cl.$^5$ .............................................. C01B 21/00
[52] U.S. Cl. .................................... 423/235; 423/358
[58] Field of Search .................. 423/235, 235 D, 358, 423/239, 239 A

[56] References Cited

U.S. PATENT DOCUMENTS

| | | |
|---|---|---|
| 3,900,554 | 8/1975 | Lyon . |
| 4,087,513 | 5/1978 | Schell . |
| 4,119,702 | 10/1978 | Azuhata et al. ............... 423/235 |
| 4,168,299 | 9/1979 | Schell . |
| 4,208,386 | 6/1980 | Arand et al. . |
| 4,325,924 | 4/1982 | Arand et al. . |
| 4,777,024 | 10/1988 | Epperly et al. . |
| 4,780,289 | 10/1988 | Epperly et al. . |
| 4,946,659 | 8/1990 | Held et al. . |

FOREIGN PATENT DOCUMENTS

| | | |
|---|---|---|
| 200617 | 5/1983 | Fed. Rep. of Germany . |
| 1-9665 | 1/1989 | Japan . |
| 8105027 | 6/1983 | Netherlands . |

*Primary Examiner*—Gregory A. Heller
*Attorney, Agent, or Firm*—St. Onge Steward Johnston & Reens

[57] ABSTRACT

The present invention relates to a process for the in-line hydrolysis of urea. More particularly, the process involves heating an aqueous solution of urea while flowing through a conduit to a temperature and for a time effective to hydrolyze urea to produce hydrolysis products comprising ammonium carbamate, ammonium carbonate, ammonium bicarbonate, and ammonia. The hydrolysis products are useful for the reduction of nitrogen oxides in combustion effluents without the generation of substantial amounts of nitrous oxide.

19 Claims, 2 Drawing Sheets

PROCESS FOR THE IN-LINE HYDROLYSIS OF UREA

TECHNICAL FIELD

The present invention relates to a process for the in-line hydrolysis of urea in order to facilitate the reduction of nitrogen oxides ($NO_x$) in a combustion effluent. The reduction of nitrogen oxides is accomplished by utilizing the hydrolysis products of urea to minimize the generation of nitrous oxide ($N_2O$).

Carbonaceous fuels can be made to burn more completely and with reduced emissions of carbon monoxide and unburned hydrocarbons when the oxygen concentrations and air/fuel ratios employed are those which permit high-flame temperatures. When fossil fuels are used in suspension fired boilers, such as large utility boilers, temperatures above about 2000° F. and typically about 2200° F. to about 3000° F. are generated. Unfortunately, such high temperatures tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F., as well as gas turbines and diesel engines.

Nitrogen oxides are troublesome pollutants which are found in the combustion streams of boilers when fired as described above, and comprise a major irritant in smog. It is further believed that nitrogen oxides can undergo a process known as photochemical smog formation, through a series of reactions in the presence of some hydrocarbons. Moreover, nitrogen oxides comprise a significant contributor to acid rain and have been implicated as contributing to the undesirable depletion of the ozone layer. They may also impact on the warming of the atmosphere commonly referred to as "the greenhouse effect". Some or all of these effects are also believed to be attributable to nitrous oxide.

Recently, many processes for the reduction of $NO_x$ in combustion effluents have been developed. They can generally be segregated into two basic categories: selective and non-selective. Among the selective processes, which are believed in the art to be the more desirable, there is a further division between selective catalytic reduction (SCR) and selective non-catalytic reduction (SNCR) processes. Although SCR processes are believed to be capable of achieving higher levels of nitrogen oxides reductions, SNCR processes are often preferred because of their greater economy and flexibility.

SNCR processes, which are temperature dependent, generally utilize a nitrogenous substance such as urea or ammonia, as well as non-nitrogenous substances, and proceed in the gas phase by a complex series of free radical-mediated chemical reactions and involve various nitrogen, hydrogen, oxygen, and carbon-containing species and radicals. Unfortunately, it has recently been found that many nitrogenous substances, when introduced into a combustion effluent, can lead to the generation of nitrous oxide. Urea is generally considered the most desirable $NO_x$ reducing species because of its effectiveness and relatively broad temperature window, as well as its relatively non-toxic and environmentally benign nature. Urea breaks down into the amino radical ($NH_2\cdot$), which is believed to be the moiety responsible for the reduction of $NO_x$, but can also, under certain conditions, break down into cyanic or isocyanic acid according to the following reaction formula $$2NH_2CONH_2 + OH\cdot \rightarrow 3NH_2\cdot + HOCN \text{ (or HNCO)} + H_2O + CO$$

The amido radical can then proceed to reduce $NO_x$ according to the following reaction pathway $$NH_2\cdot + NO \rightarrow N_2 + H_2O$$

but the cyanic or isocyanic acid produced can then proceed further to form nitrous oxide and carbon monoxide or molecular nitrogen and carbon dioxide when combined with $NO_x$ according to the following set of reactions $$HOCN \text{ (or HNCO)} + OH\cdot \rightarrow NCO\cdot + H_2O$$

$$NCO\cdot + NO \rightarrow N_2O + CO$$

$$NCO\cdot + NO \rightarrow N_2 + CO_2$$

When $N_2O$ is formed, the effectiveness of urea is somewhat decreased, although $NO_x$ is being substantially reduced, because another pollutant species, $N_2O$, is sometimes discharged.

What is desired, therefore, is a process which enables the desired $NO_x$ reducing capabilities of urea to be exploited, as well as the stability and ease of handling of urea, without the generation of $N_2O$.

BACKGROUND ART

Processes and compositions for the reduction of nitrogen oxides in an effluent from the combustion of a carbonaceous fuel have been developed extensively over recent years. With the increased attention to the health risks and environmental damage caused by agents such as smog and acid rain, it is expected that $NO_x$ reduction research will continue to be pursued.

In an early application of the use of nitrogenous treatment agents to reduce $NO_x$, Lyon in U.S. Pat. No. 3,900,554, describes a process for reducing nitrogen monoxide (NO) from combustion effluents by introducing ammonia or certain "ammonia precursors" into the effluent at temperatures which range from 1300° F. to 2000° F. In U.S. Pat. No. 4,208,386, Arand, Muzio, and Sotter improve on the Lyon process by teaching the introduction of urea for $NO_x$ reduction in oxygen-rich effluents at temperatures in the range of 1600° F. to 2000° F., when urea is introduced into the effluent alone, and 1300° F. to 1600° F. when urea is introduced with an ancillary reducing material. Arand, with Muzio and Teixeria, in U.S. Pat. No. 4,325,924 also teach the introduction of urea into fuel-rich combustion effluents to reduce $NO_x$ at temperatures in excess of about 1900° F.

More recently, in a unique application of $NO_x$ reducing principles, Epperly, Peter-Hoblyn, Shulof, Jr., and Sullivan, in U.S. Pat. No. 4,777,024 disclose a method for achieving substantial nitrogen oxides reductions while minimizing the production of so-called secondary pollutants, such as ammonia and carbon monoxide, through a multiple stage injection process. Moreover, Epperly, O'Leary, and Sullivan, in U.S. Pat. No. 4,780,289 have disclosed a complementary process for achieving significant, and potentially maximized, $NO_x$ reductions while minimizing the production of secondary pollutants by utilizing the nitrogen oxides reduction versus effluent temperature curve of the treatment regimen being effected at each $NO_x$ reduction introduction in a combustion system. These inventions, though, focus mainly on minimizing the levels of ammonia and carbon monoxide while performing nitrogen oxides reductions and do not specifically address the generation of nitrous oxide.

Schell, in U.S. Pat. Nos. 4,087,513 and 4,168,299, discloses processes for the hydrolyzation of urea to ammonia and carbon dioxide to eliminate urea from the waste water stream formed during urea production. These processes involve introducing the waste water stream into a carbon dioxide recovery system, optionally in the presence of vanadium pentoxide. These patents, though, do not suggest the use of the urea hydrolyzation products for nitrogen oxides reduction, and especially not the use of hydrolyzation products ammonium carbamate, ammonium carbonate, ammonium bicarbonate, and ammonia for $NO_x$ reduction without generating $N_2O$.

What is desired, therefore, is a system whereby nitrogen oxides reductions can be achieved while taking advantage of the advantages of the use of urea without the concommitant risk of generation of substantial amounts of $N_2O$.

DISCLOSURE OF INVENTION

The present invention relates to a process for the in-line hydrolysis of urea. Through the application of this process, urea can be hydrolyzed in line as it is being supplied to a combustion effluent in order to produce hydrolysis products which are effective at reducing nitrogen oxides without generating $N_2O$. The in-line hydrolysis of urea can be effected by heating an aqueous urea solution to a temperature and for a time effective to hydrolyze urea, particularly to a temperature no greater than 450° F., even about 500° F., as it is being supplied to a boiler.

In addition, the hydrolysis reaction can be improved by conducting it in an acidic or a basic environment or in the presence of certain catalysts or enzymes.

BRIEF DESCRIPTION OF THE DRAWING

The objects of this invention will be described in the present invention better understood and its advantages more apparent in view of the following detailed description, especially when read with reference to the appended drawings wherein.

BEST MODE FOR CARRYING OUT THE INVENTION

Figure 1:
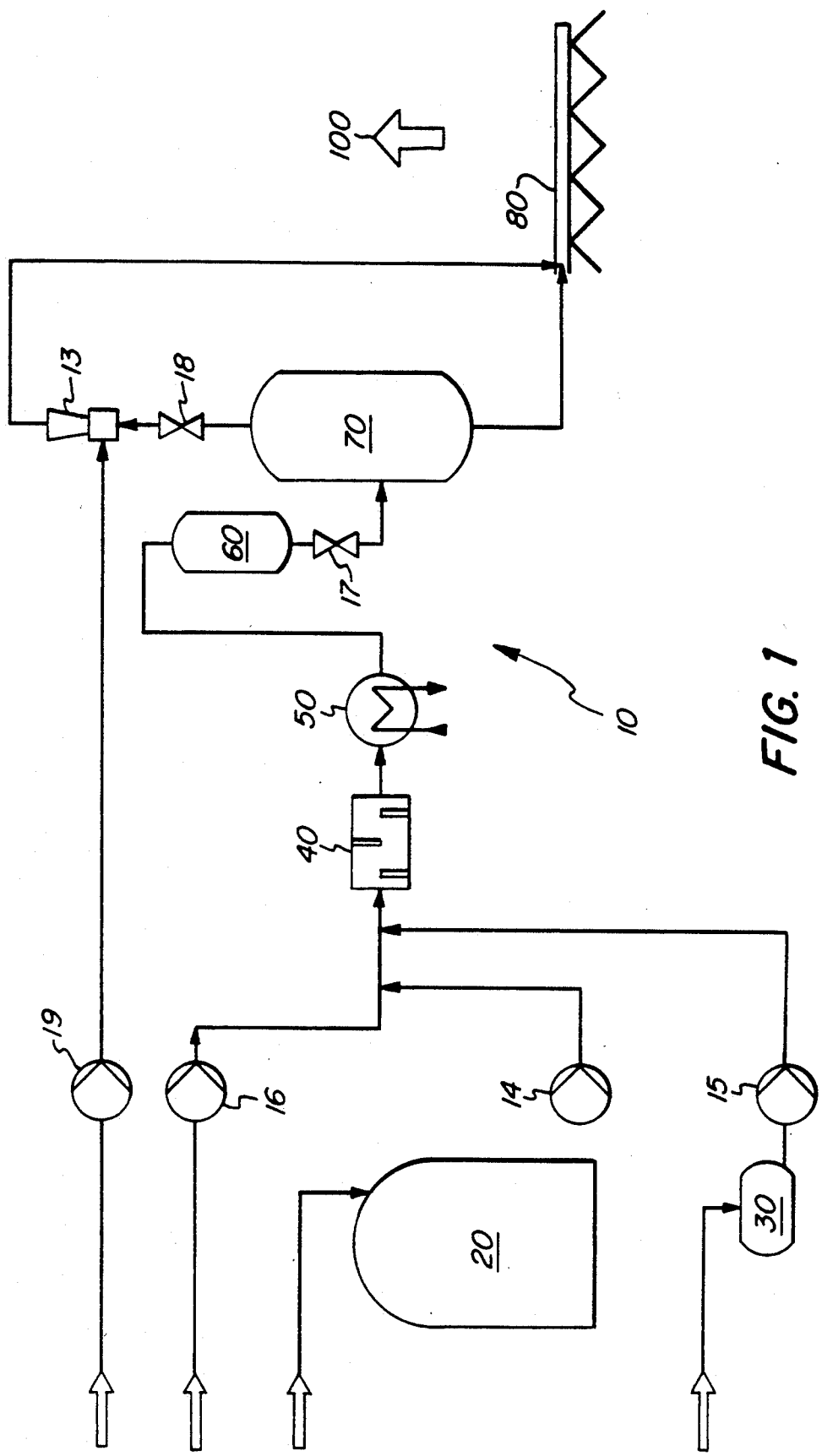
FIG. 1 is a schematic illustration of an apparatus for conducting urea hydrolysis under pressure with subsequent injection of the hydrolysis products into a combustion effluent.

As noted above, the present invention relates to the in-line hydrolysis of urea for the formation of hydrolysis products which can be introduced into a combustion effluent for the reduction of nitrogen oxides without the generation of nitrous oxide. The hydrolysis products produced include ammonium carbamate ($NH_2COONH_4$), ammonium carbonate (($NH_4)_2CO_3$) and a mixture of ammonia ($NH_3$) and ammonium bicarbonate ($NH_4HCO_3$). Although each of these hydrolysis products is commercially available, it is more desirable to produce them by in-line hydrolysis because of the stability and relative safety of urea for transport and storage. Further, the solubility of ammonium carbonate and ammonium bicarbonate is substantially lower than that of urea, limiting their usefulness as a starting material. In the high temperature environment of a combustion effluent, these hydrolysis products can break down to form amino radicals which combine with nitrogen oxides as noted above to reduce them to $N_2$.

Hydrolysis of urea can be performed in-line, for instance while the urea is being supplied to an injector or other introduction means to be introduced into a combustion effluent. This can be accomplished by passing an aqueous solution of urea, at a concentration of about 5% to about 45%, advantageously about 7% to about 15%, through a supply conduit (referred to as a reaction conduit or tube) and applying heat and pressure, maintaining the pressure above the partial pressure of the system $NH_4/NH_3/CO_2/H_2O$ at the selected temperature. The conduit can be any of the conventional tubes or pipes currently used to supply urea solutions to a combustion effluent in a $NO_x$ reducing apparatus. Thus the process can be practiced without significantly effecting the efficiency of current urea-mediated $NO_x$ reducing processes since it does not require substantial alteration or retrofitting of current installations.

In order to hydrolyze the urea, the urea solution is raised to a temperature and for a time effective to hydrolyze the urea to ammonium carbamate, ammonium carbonate, ammonium bicarbonate, and ammonia. Generally, such temperatures are no greater than about 500° F., and preferably range from about 300° F. to about 450° F., more preferably about 325° F. to about 375° F. for a period of time of at least about three minutes in order to achieve substantial hydrolysis of the urea. Advantageously, hydrolysis need only proceed for a maximum of about six minutes for substantial completion. This reaction can be increased by also maintaining the urea solution under pressure, preferably pressure in excess of about 1,200 pounds per square inch (psi), more preferably pressures in excess of about 1,500 psi.

Although hydrolysis by the application of heat and pressure is effective for urea hydrolysis, this hydrolysis reaction can be promoted (i.e., the efficiency increased) by the addition of a hydrolysis agent, such as one which functions by either raising or lowering the pH of the aqueous urea solution, together with or sequentially after application of heat (and pressure). In other words, a pH neutral urea solution can be made more alkaline or more acidic to promote hydrolysis.

In order to hydrolyze urea under basic conditions, the pH of the aqueous urea solution is raised by the addition of an alkaline agent such as potassium hydroxide, sodium hydroxide, calcium hydroxide, calcium ammonia and ammonium bicarbonate. Although any increase in the pH will result in a greater rate of hydrolysis, it is desired for a substantial increase in hydrolysis that the pH be raised to at least about pH 11 or higher, even pH 12 or higher.

When this basic hydrolysis process is being utilized, the temperature to which the urea solution is raised need not be as high as if heat were being utilized alone in order to achieve equivalent results. In this case, the temperature need only be raised to temperatures not exceeding about 400° F., especially about 280° F. to about 370° F. and preferably about 300° F. to about 350° F. Likewise, the pressure of the solution need only be raised to about 450 psi to about 600 psi, preferably about 500 psi to 560 psi. Advantageously, though, the temperatures and pressures applied when heat is used alone for hydrolysis are used when basic hydrolysis is employed, in order to provide significant increases in the efficiency of the hydrolysis reaction.

To perform the acidic hydrolysis of urea, the pH of the aqueous urea solution is lowered, for instance by the addition of an acid or acid salt especially in solution, such as a buffered solution. Exemplary acids or acid salts include sulfuric acid, hydrochloric acid, formic acid, acetic acid, citric acid, ammonium hydrogen sulfate, or mixtures thereof. The use of formic acid and acetic acid are advantageous in this respect, because when combined with the hydrolysis product ammonia they can form the ammonium salts, ammonium acetate, and ammonium formate. These salts have been suggested as having a $NO_x$ reducing effect at temperatures below those of urea.

Preferably, the pH of the solution when acidic hydrolysis is employed is brought to a level below about pH 5, most preferably below about pH 3 in order to substantially promote the hydrolysis of urea, although this is not critical. As was the case for basic hydrolysis, when acids are being added to the aqueous urea solution for hydrolysis the temperature need not be raised to those when heat is being used for hydrolysis alone. In the case of acidic hydrolysis, the temperature need only be raised to temperatures no greater than about 400° F., especially about 280° F. to about 370° F. and most preferably about 300° F. to about 350° F. in order to achieve results equivalents to those achieved with hydrolysis mediated by heat only. The pressure need only be raised to those used for basic hydrolysis. It is desired, though, that the application of heat and pressure be in the ranges discussed above for hydrolysis by heat alone in order to achieve increased hydrolysis efficiency.

In performing either the alkaline or acidic hydrolysis of urea, the acidic or basic agent being added is admixed with the aqueous urea solution immediately before or during the application of heat and pressure, or immediately thereafter. The admixed solution is maintained for a period of about three to six minutes prior to introduction into the effluent, although the upper time limit is not considered critical.

As noted above, urea hydrolysis can also be performed using, as the hydrolysis agent, suitable catalysts or enzymes, in either a heterogeneous or homogeneous system.

In the heterogeneous embodiment, the catalyst is present on a fixed bed, for instance as a coating on the inside of the conduit through which the urea solution is flowing or on installations in the path of the flow: or in the form of catalyst particles suspended in the urea solution. Both the fixed bed and suspended catalyst particles preferably contain metals, especially metal oxides, metal salts, or mixtures thereof as the active catalyst ingredient. Advantageous suitable metals include copper, vanadium, iron, nickel, chromium, manganese, and their oxides and salts, especially their sulfate or chromate salts. In addition, a suspension of flue-ash or a suspension of oil black which can be found in vessels operated with heavy oil, can also be used as a heterogeneous catalyst To achieve urea hydrolysis by means of a homogeneous catalyst, the aqueous urea solution can be admixed with catalyst in the form of water soluble metal salts, for instance, the sulfate or nitrate salts of metal such as copper and nickel. In this situation also filtrates of flue-ash suspension can also be utilized as catalyst.

Urea hydrolysis can also be performed utilizing enzymes such as urease as a catalyst for the hydrolysis reaction. The enzyme can be added as it is or attached to an inert carrier particle in order to perform hydrolysis in the urea solution. The mixture of the enzyme with the aqueous urea solution is preferably circulated in a reactor with the hydrolysis products removed via a separation element. These hydrolysis products can then be introduced into the combustion effluent. Suitable separation elements include filter elements such as ultra filtration membranes. The enzyme can also be bound to an immobile phase which can be present in the reaction conduit, for instance, in the form of hollow fibers or other carrier particles.

The hydrolysis products can be introduced into the effluent by suitable introduction means under conditions effective to reduce the effluent nitrogen oxides concentration in a selective, non-catalytic, gas-phase process. Suitable introduction means include injectors, such as those disclosed by Burton in U.S. Pat. No. 4,842,834, or DeVita in U.S. Pat. No. 4,915,036, the disclosures of which are incorporated herein by reference. One preferred type of injection means is an injection lance, especially a lance of the type disclosed by Peter-Hoblyn and Grimard in International Application PCT/EP89/00765, filed Jul. 4, 1989, entitled "Lance-Type Injection Apparatus", the disclosure of which is incorporated herein by reference.

Generally, the hydrolyzed urea solution of this invention is introduced into the effluent in an amount effective to elicit a reduction in the nitrogen oxides concentration in the effluent. Advantageously, the hydrolyzation products are introduced into the effluent in an amount sufficient to provide a molar ratio of the nitrogen contained in the solution to the baseline nitrogen oxides level (by which is meant the pretreatment level of $NO_x$ in the effluent) of about 1:5 to about 10:1. More preferably, the hydrolyzed solution is introduced into the effluent to provide a molar ratio of solution nitrogen to baseline nitrogen oxides level of about 1:3 to about 5:1, most preferably about 1:2 to about 3:1.

The hydrolyzed urea solution produced by the process of this invention is preferably injected into the effluent gas stream at a point where the effluent is at a temperature above about 1300° F., more preferably above about 1400° F. Large industrial and circulating fluidized bed boilers of the types employed for utility power plants and other large facilities will typically have access only at limited points. In the most typical situations, the boiler interior in the area above the flame operates at temperatures which at full load approach 2200° F., even 2300° F. After subsequent heat exchange, the temperature will be lower, usually in the range between about 1300° F. and 2100° F. At these temperatures, the hydrolyzation products produced in accordance with this invention can be effectively introduced to accomplish substantial reduction of nitrogen oxides in the effluent without the generation of significant amounts of nitrous oxide.

Optionally, the hydrolyzation products can be enhanced by other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, molasses, sugar, 5- or 6-membered heterocyclic hydrocarbons having at least one cyclic nitrogen such as pyridine and pyrolidine, hydroxy amino hydrocarbons such as milk or skimmed milk, amino acids, proteins, and monoethanolamine and various other compounds which are disclosed as being effective at reducing nitrogen oxides in an effluent. These "enhancers", which are preferably present in an amount of about 0.5% to about 25% by weight when employed, function to lower the effluent temperatures at which hydrolyzed urea solution is most effective.

Such enhancers as well as others which may be suitable are disclosed in, for instance, U.S. Pat. No. 4,751,065; U.S. Pat. No. 4,927,612; U.S. Pat. No. 4,719,092; U.S. Pat. No. 4,888,164; U.S. Pat. No. 4,877,591; U.S. Pat. No. 4,803,059; U.S. Pat. No. 4,844,878; U.S. Pat. No. 4,873,066; U.S. Pat. No. 4,770,863; U.S. Pat. No. 4,902,488; U.S. Pat. No. 4,863,704; U.S. Pat. No. 4,863,705; and International Patent Application entitled "Composition for Introduction into a High Temperature Environment", having Publication No. WO 89/10182, filed in the names of Epperly, Sprague, and von Harpe on Apr. 28, 1989, the disclosures of each of which are incorporated herein by reference.

When the solution is introduced without a non-nitrogenous hydrocarbon component, it is preferably introduced at an effluent temperature of about 1600° F. to about 2100° F., more preferably about 1700° F. to about 2100° F. When the solution also comprises one of the enhancers discussed above, it is preferably introduced at an effluent temperature of about 1300° F. to about 1750° F., more preferably about 1400° F. to about 1750° F. or higher. These effluent temperatures at the point of introduction can be varied depending on the particular components of the treatment agent and other effluent conditions, such as the effluent oxygen level, as discussed in the referenced disclosures.

The effluent into which the hydrolyzation products of this invention is injected is preferably oxygen-rich, meaning that there is an excess of oxygen in the effluent. Advantageously, the excess of oxygen is greater than about 1% by volume. Most preferably, the excess of oxygen is in the range of about 1% to about 12% or greater by volume.

In a preferred embodiment of the invention, the in-line hydrolysis of urea is carried out by mixing an aqueous urea solution with the acid, base, or catalyst in a static mixer. This mixture is then heated, such as by passing through a heat exchanger or other suitable apparatus, and brought to the desired pressure and then passed to a decompression vessel in which the pressure is lowered, which causes the mixture to undergo separation into a liquid and gaseous phase. The liquid phase contains the liquid or liquid soluble hydrolysis products, ammonium carbamate, ammonium carbonate, and ammonium bicarbonate, which can then be introduced into the effluent, and the gaseous phase comprises the hydrolysis product ammonia, as well as carbon dioxide, which can also be introduced into the effluent. If the temperature of the mixture is brought to approximately room temperature (i.e. about 70° F.), the gases ammonia and carbon dioxide remain dissolved in the aqueous solution. Under these conditions the decompression vessel is not needed and the mixture itself can be directly introduced into the effluent In a more preferred embodiment, the mixture of the aqueous urea solution with the acidic or basic agents or the catalyst is heated while passing through the conduits as described above to the injector with hydrolysis occurring in line and the hydrolyzed urea solution introduced directly into the effluent.

The heat exchanger for heating the urea solution may be positioned in the effluent stream and as a result of this, the heat required for facilitating the urea hydrolysis reaction is withdrawn from the effluent to avoid the need for an independent heat source. Such heat exchanger preferably forms a unit together with the apparatus on which the injection means are arranged within the effluent stream. The heat exchanger at the same time cools the injector means, such as the injection lances, which is desirable at high combustion temperatures. The heat exchanger is preferably constructed in the form of a jacket around the injection lance. The heated and hydrolyzed urea solution is passed from the heat exchanger to a flash drum positioned outside the effluent, and the gaseous or liquid phase formed is separately supplied to the injectors of the injection lance, while pressurized air may optionally be added to the gaseous phase. In the latter embodiment, in particular if the hydrolysis is achieved by acidic hydrolysis, and any ammonia formed reacts with excess acid to form ammonium salts, the decompression vessel can be dispensed with and the hydrolyzed urea solution can be injected directly.

When the hydrolysis is mediated by an enzymatic catalyst, the urea solution is recycled together with the enzyme to an intermediate stirring vessel or through a fixed bed of immobilized enzyme. The hydrolyzed products are then optionally withdrawn via a filter element and introduced into the effluent.

A typical apparatus for achieving acidic, basic, or catalytic hydrolysis with introduction of the hydrolysis products into the effluent is illustrated in FIG. 1. As shown, the illustrated apparatus 10 comprises a urea storage tank 20, a hydrolyzing agent storage tank 30 (for the acid, base, or catalyst), a water supply line 11, a pressurized air supply line 12, a static mixer 40, a heat exchanger 50, a reaction conduit 60, a decompression vessel 70, an entrainment jet 13, and an injection means 80, which extends into the effluent 100. Urea solution is supplied from urea storage tank 20, hydrolyzation agent from storage tank 30, and dilution water are all supplied to static mixer 40, via pumps 14, 15, and 16. The resultant mixture is heated to the desired temperature in heat exchanger 50, passes through reaction conduit 60, and is supplied to the decompression vessel 70 via decompression valve 17. In the decompression vessel 70, liquid phase separates from gaseous phase. The resulting gaseous phase is withdrawn via valve 18 by means of entrainment jet 13, which is operated with pressurized air from pressurized air supply line 12 through pump 19. Whether the hydrolysis gases are entrained by the pressurized air or whether ambient air is entrained by the pressurized hydrolysis gases depends on the quantitative ratios and pressure conditions. The gas mixture (i.e., hydrolysis gases and air) and the liquid phase from decompression vessel 70 are each supplied to injection means such as two-phase nozzles arranged in the effluent stream and introduced into the effluent.

Figure 2:
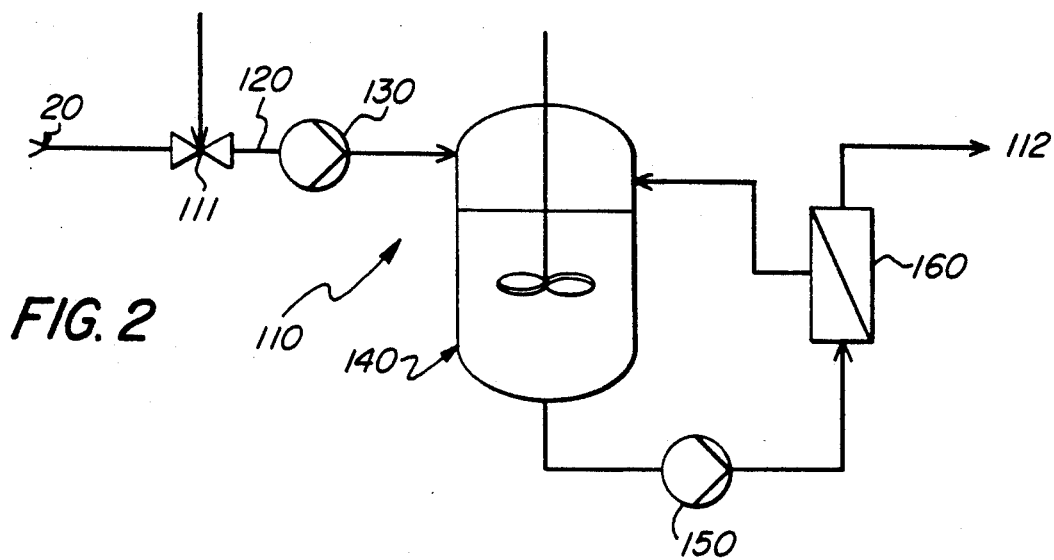
FIG. 2 is a schematic illustration of an apparatus for the enzymatic hydrolysis of urea with suspended enzyme particles.

FIG. 2 illustrates the use of an enzymatic catalyst for hydrolysis of urea. The apparatus 110 illustrated comprises mixing valve 111, conduit 120, pressure pump 130, stirring vessel 140, which contains the reaction mixture, circulation pump 150, filter element 160, and withdrawal conduit 112. After mixing the urea solution with the appropriate amount of enzyme from enzyme conduit 120 via mixing valve 111, the urea solution passes from storage tank 20 into stirring vessel 140, via pressure pump 130. The reaction solution circulates via circulation pump 150 and filter element 160. In filter element 160, a partial stream leaves the system via conduit 112 while the enzymes are recycled via a filter membrane, such as a filter plug, a flat membrane, a coiled membrane, or a hollow fiber membrane, over which the flow passes tangentially.

Figure 3:
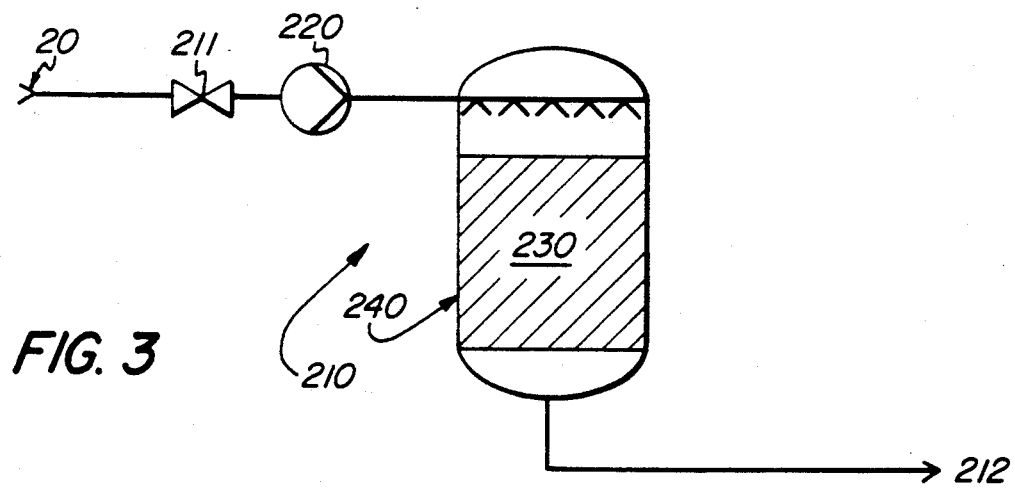
FIG. 3 is a schematic illustration of an apparatus for the enzymatic hydrolysis of urea with the enzyme loaded on a fixed bed.

FIG. 3 illustrates an apparatus 210 for the hydrolysis of urea using enzymatic catalysis on a fixed bed. In this apparatus the urea solution is supplied from storage tank 20 via valve 211 and pump 220 and passes through fixed bed 230 situated in a reaction vessel 240 which consists of balls or fillers on which the enzyme is immobilized. The hydrolyzed urea solution then leaves via a withdrawal conduit 212 to be introduced into the effluent.

The use of the present invention to achieve the hydrolysis of urea in an aqueous solution in order to facilitate the reduction of nitrogen oxides concentration in a combustion effluent without generating a substantial amount of $N_2O$ is illustrated by reference to the following examples.

EXAMPLE 1

The reaction conduit utilized is an externally heated reaction tube having a nominal length of 20 feet and an inner diameter of 0.872 centimeters. The reaction tube is fitted with a high pressure piston pump and a back pressure valve to control the operating pressure of aqueous urea solution flowing through the tube.

A solution of 200 grams urea in 1000 ml of water is fed through the reaction tube at a flow rate of 10.7 ml/min. The reaction tube is maintained at a temperature of 310° F. and the urea solution is passed through against a back-pressure of 1620 psi. The hydrolyzed solution is collected at the outlet of the reaction tube following the back pressure valve and analyzed for $NH_4$. ions or $NH_3$ using a gas sensitive electrode. The hydrolyzed solution is found to contain a mean concentration of 1.7 moles per liter of $NH_4$. or $NH_3$, which indicates a yield of 51% hydrolyzed product based on the initial urea concentration.

EXAMPLE 2

The process of Example 1 is repeated except two moles of formic acid per mole of urea is added to the solution. The pH of the solution is found to be 1.5. to provide a pH of 1.5. The hydrolyzed solution is found to contain a mean concentration of 2.8 moles of $NH_4$- or $NH_3$ species per liter, which indicates a yield of 84% hydrolyzed product based on the initial urea concentration. In addition, the pH of the hydrolyzed solution is found to be 7.0 indicating a neutralization of the acid.

EXAMPLE 3

The procedure of Example 1 is repeated except one mole of sodium hydroxide is added per mole of urea. The pH of the solution is found to be 14. The hydrolzyed solution is found to contain a mean concentration of 3.0 moles of $NH_4$. or $NH_3$ per liter, which indicates a yield of 90% hydrolyzed product based on the initial urea concentration. In addition, the pH of the hydrolyzed solution is found to be 11.5, indicating a neutralization of the base.

It is to be understood that the above examples are given by way of illustration only and are not to be construed as limiting the invention.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of nitrogen oxides in a combustion effluent, the process comprising
   a) providing an aqueous solution of urea such that it is flowing through a conduit of a nitrogen oxides reduction apparatus;
   b) heating said urea solution to a temperature of at least about 300° F. for at least about three minutes while it is flowing through said conduit to hydrolyze said urea to produce hydrolysis products comprising at least one of ammonium carbamate, ammonium carbonate, ammonium bicarbonate, or mixtures thereof; and
   c) introducing said hydrolysis products into a combustion effluent under conditions effective to reduce the nitrogen oxides concentration therein.

2. The process of claim 1, wherein the urea solution is heated to a temperature no greater than about 500° F.

3. The process of claim 1, wherein the urea solution is subjected to a pressure in excess of about 1200 pounds per square inch.

4. The process of claim 3, wherein the pH of the urea solution is increased to at least about 11.

5. The process of claim 4, wherein the urea solution is admixed with an alkaline agent selected from the group consisting of potassium hydroxide, sodium hydroxide, calcium hydroxide, calcium oxide, magnesium oxide, semicalcined dolomite, ammonia, ammonium bicarbonate, ammonium carbamate, ammonium carbonate, and mixtures thereof.

6. The process of claim 1, wherein the pH of the urea solution is decreased by admixing with an acidic agent.

7. The process of claim 6, wherein the pH of the urea solution is decreased to no greater than about 5.

8. The process of claim 7, wherein the urea solution is admixed with an acidic agent selected from the group consisting of sulfuric acid, hydrochloric acid, formic acid, acetic acid, citric acid, ammonium hydrogen sulfate, ammonium bisulfate, and mixtures thereof.

9. The process of claim 1, wherein the urea solution is contracted with a catalyst or enzyme for the hydrolysis of urea.

10. The process of claim 9, wherein said catalyst is selected from the group consisting of metals, metal oxides, metal salts, and mixtures thereof.

11. The process according to claim 10, wherein the catalytic hydrolysis occurs in a fixed bed reactor.

12. The process according to claim 11, wherein the catalytic hydrolysis occurs in a pipe covered with a catalyst or in catalyst-bearing installations in the reaction path.

13. The process according to claim 10, wherein the catalytic hydrolysis produced by means of suspended catalyst particles.

14. The process according to claim 9, wherein said catalyst is a suspension of flue ash or oil black.

15. The process of claim 19, wherein said enzyme is urease.

16. The process according to claim 15, wherein the urea solution is passed through at least one suitable reactor, whereby the urea solution is circulated for hydrolysis together with an enzyme, the hydrolysis products are removed from the reactor via a separation element and are introduced into the effluent.

17. The process according to claim 16, wherein the enzyme is immobilized on inert carrier particles.

18. The process according to claim 16, wherein the separation element is a filter element suitable for separating enzyme particles.

19. The process according to claim 16, wherein the urea solution is passed through an immobile phase covered with enzymes.

* * * * *

UNITED STATES PATENT AND TRADEMARK OFFICE
CERTIFICATE OF CORRECTION

PATENT NO. : 5,240,688
DATED : August 31, 1993
INVENTOR(S) : Thure von Harpe, Reinhard Pachaly, and John E. Hofmann It is certified that error appears in the above-indentified patent and that said Letters Patent is hereby corrected as shown below:

Cover Sheet, Item [75] Inventors: "Reihard Pachaly" should read --Reinhard Pachaly-- and "John E. Holfmann" should read --John E. Hofmann-- column 1, line 67, "(NH$_2$.)" should read --(NH$_2\cdot$)--.
column 2, line 3, "+OH." should read --+OH$\cdot$--.
column 2, line 3, "3NH$_2$." should read --3NH$_2\cdot$--.
column 2, line 9, "NH$_2$." should read --NH$_2\cdot$--.
column 2, line 17, "OH." should read --OH$\cdot$--.
column 2, line 17 "NCO." should read --NCO$\cdot$--.
column 2, line 19 "NCO." should read --NCO$\cdot$--.
column 2, line 21 "NCO." should read --NCO$\cdot$--.
column 4, line 22 "NH$_4$." should read -- NH$_4\cdot$--.
column 5, line 66 "catalyst" should read --catalyst.--.
column 7, line 68, "effluent" should read --effluent.--.
column 9, line 44, "NH$_4$." should read --NH$_4\cdot$--.
column 9, line 53, "NH$_4$." should read --NH$_4\cdot$--.
column 9, line 64, "NH$_4$." should read --NH$_4\cdot$--.

Signed and Sealed this

Twelfth Day of April, 1994

Attest:

BRUCE LEHMAN

Attesting Officer     Commissioner of Patents and Trademarks